United States Patent [19]

O'Sullivan

[11] 4,100,141

[45] Jul. 11, 1978

[54] STABILIZED ADHESIVE AND CURING COMPOSITIONS

[75] Inventor: Denis Joseph O'Sullivan, Dublin, Ireland

[73] Assignee: Loctite (Ireland) Limited, Dublin, Ireland

[21] Appl. No.: 702,309

[22] Filed: Jul. 2, 1976

[51] Int. Cl.² .................. C08F 112/08; C08F 114/06; C08F 120/14
[52] U.S. Cl. ............................. 526/301; 204/159.23; 526/193; 526/209; 526/278; 526/320; 526/328; 526/329.7; 526/335; 526/343; 526/344; 526/346; 526/227; 526/230; 526/292; 526/309
[58] Field of Search ............... 526/193, 209, 278, 328, 526/320, 329.7, 335, 343, 344, 346; 260/47 UA, 77.5 CR; 204/159.23

[56] References Cited

U.S. PATENT DOCUMENTS

| | | | |
|---|---|---|---|
| 3,479,246 | 11/1969 | Stapleton | 526/209 |
| 3,502,629 | 3/1970 | Matthews | 526/209 |

*Primary Examiner*—Harry Wong, Jr.
*Attorney, Agent, or Firm*—Eugene F. Miller; Jean B. Mauro

[57] ABSTRACT

Stabilized, curable compositions formed from known free radical-polymerizable monomers (e.g., acrylates, stryene, etc.), and free radical initiators (e.g., peroxides, hydroperoxides, ultraviolet-sensitive compounds) by dissolving therein compounds containing the combination of allyl, lower alkoxyl and hydroxyl groups. All the groups may be present in one molecule, or the allyl group may occur in a separate molecule. Concentration of each compound may be in the range of about 0.01 to about 5 percent by weight of the total composition.

17 Claims, No Drawings

STABILIZED ADHESIVE AND CURING COMPOSITIONS

BACKGROUND OF THE INVENTION

This invention relates to adhesive compositions and, in general, curing compositions of the type wherein cure is initiated by means of peroxy compounds such as peroxides or hydroperoxides or by means of ultraviolet irradiation, and takes place by virtue of free radical polymerization. Such compounds typically contain vinyl unsaturation.

It is desirable that compositions of the kind indicated shall be stable in storage for extended periods. Many of these compositions are anaerobic, i.e., undergo cure when deprived of access to oxygen, but can be caused to cure by other means. It is desirable that such anaerobic compositions be preserved from curing when stored in an oxygen-poor environment, in order to undergo cure later, when required, by the use of said other means.

Certain types of compounds are well known as inhibitors of premature polymerization for such compounds. Typically, these inhibitors are quinone- or hydroquinone-type compounds and their derivatives. Free radical scavengers of various types have also been used with some success.

None of these known inhibitors has proven fully satisfactory for all uses, however, especially in connection with acrylate and urethane-acrylate monomers such as those specifically described herein. Inhibitor systems capable of imparting significantly improved stability to free radical curing compositions would thus have great utility.

SUMMARY OF THE INVENTION

The present invention provides inhibitor systems which provide advantageous and unexpected improvements in stability. Accordingly, the present invention provides a stabilized, curable composition comprising:
a. a free radical-polymerizable monomer;
b. an effective amount for initiation of a peroxy or photo-sensitive initiator; and
c. an effective amount for stabilization of the composition of an inhibitor system selected from the group consisting of an allyl alkoxy hydroquinone and the combination of an allyl compound with an alkoxyl hydroquinone, said inhibitor system being dissolved in the monomer.

Preferred monomers are those prepared by reacting at a temperature between about 10° C. and about 175° C.: (i) an organic polyisocyanate; and (ii) an acrylate ester containing a hydroxy or amino group in the non-acrylate portion thereof, the ester being used in sufficient amount to react with substantially all of the isocyanate groups of the polyisocyanate.

Other preferred monomers are those having the formula

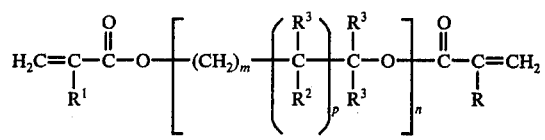

wherein $R^6$ represents a radical selected from the group consisting of hydrogen, lower alkyl of 1–4 carbon atoms, hydroxyalkyl of 1–4 carbon atoms, and

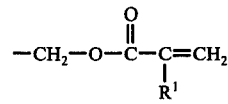

$R^1$ is a radical selected from the group consisting of hydrogen, halogen, and lower alkyl of 1–4 carbon atoms; $R^5$ is a radical selected from the group consisting of hydrogen, —OH and

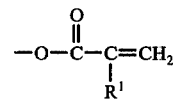

$m$ is an integer equal to at least 1; $n$ is an integer equal to at least 1; and $p$ is 0 or 1.

There is also provided a method of stabilizing a curable composition comprising a free radical-polymerizable monomer and an effective amount for initiation of a peroxy or photo-sensitive initiator, comprising dissolving in the monomer an effective amount for stabilization of the composition of an inhibitor system selected from the group consisting of an allyl alkoxyl hydroquinone and the combination of an allyl compound with an alkoxyl hydroquinone.

Photo-initiated compositions are especially benefited since, by using increased levels of the inhibitor systems, improved stability is obtained without sacrifice of desirable cure properties.

With curable compositions which are inherently anaerobic in nature, the present inhibitor systems can effectively suppress the anaerobic cure characteristics, thereby allowing these desirable monomer compositions to be utilized in oxygen-starved applications, such as the adhesive layer on tightly-wound tapes or in oxygen-impermeable containers such as aerosol cans.

DETAILED DESCRIPTION OF THE INVENTION

Stabilization of free radical-curing compositions is effected by dissolving in those compositions an inhibitor system comprising a single compound or a pair of compounds having certain specific groups in the molecule.

When a single compound is used the said groups are allyl, aromatic alkoxyl and aromatic hydroxyl, and a preferred compound is of the formula

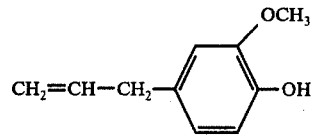

When, on the other hand, a pair of compounds is used, one member of the pair has aromatic alkoxyl and aromatic hydroxyl in the molecule, and hydroquinone monomethyl ester, of the formula

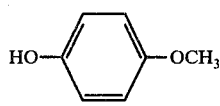

is preferred; the other member of the pair has the allyl group CH$_2$=CH—CH$_2$— in the molecule, and preferred compounds are triallyl phosphate and diallyl phthalate. It is believed that in those cases where a pair of added compounds is present, the members of the pair have a mutual synergistic effect. More generally defined, the alkoxyl group may be any lower alkoxyl of 1 to about 4 carbon atoms. It will be understood that the group may also be substituted, provided only that the substituent not interfere substantially with the effectiveness of the over-all compound.

When two compounds are used, the hydroxyl and alkoxyl groups shoud occur in the same molecule.

While in the preferred compounds the alkoxyl group will be in the ortho position relative to the hydroxyl group, it may optionally also occur in the meta or para position. Similarly, when all three required groups occur in the same molecule, the allyl group need not necessarily be in the para position relative to the hydroxyl group, although that position is preferred. In either case, the aromatic group may be further substituted, provided only that the substituent not interfere substantially with the effectiveness of the inhibitor system.

When a separate allyl compound is used, it may be either organic or inorganic, the latter being preferred. However, reducing-type compounds, such as allyl phosphites and sulfites, should be avoided.

Representative useful compounds include, in addition to those already mentioned, triallyl orthoformate, triallyl phosphate, 2-allyl phenol, 4-allyl-2,6-dimethoxy phenol, 2-allyl-6-methyl phenol, and 2-allyl-4-methyl phenol, among others.

It is necessary that the inhibitor system be soluble in the monomeric composition in the concentrations used. When the inhibitor system comprises a single compound, its concentration should be in the range of about 0.01 percent to about 5 percent by weight of the total curable composition. Preferably, its concentration will be about 0.02 percent to about 2 percent, and more preferably about 0.025 to about 0.5 percent by weight of the total curable composition.

When the inhibitor system comprises two compounds, the concentration of each of them may be in the range of about 0.01 percent to about 5 percent by weight of the total curable composition. Preferably, the concentration of the allyl compound will be in the range of about 0.1 percent to about 4 percent, and more preferably about 1 to about 2 percent. Preferably, the concentration of the alkoxyl phenol will be about 0.1 to about 3 percent, and more preferably about 0.2 to about 0.4 percent by weight of the total curable composition. The ratio of the allyl compound to the alkoxyl phenol compound may vary over a rather wide range, typically from about 0.1:1 to about 10:1, respectively, preferably about 1:1 to about 5:1, respectively. For those curable compositions which are anaerobic in nature, it has been observed that the anaerobic cure characteristics become progressively more inhibited the closer the ratio comes to 1:1.

Because of the large number of curable monomeric compounds which may be stabilized by the present invention, it is not practical to specify concentration ranges and ratios of compounds in more than general terms. In any given case, appropriate concentrations and/or ratios may be readily determined by simple experimentation.

As has been stated, the threshold requirement is that the inhibitor system be soluble in the monomeric composition. This, of course, may be easily ascertained. Effectiveness as a stabilizer against premature polymerization may be easily determined by storing a small quantity of curable composition containing the inhibitor system at room temperature, or at an elevated temperature if an accelerated test is desired, and observing the length of time elapsed before the composition begins to gel, i.e., cure or polymerize. While the selection of test temperature is basically a matter of convenience, it has been found that 82° C. is a particularly useful temperature for acrylate and methacrylate adhesive/sealant compositions formulated with hydroperoxy initiators. In such systems, a no-gel period of 1 hour or more at 82° C. indicates a probable shelf-life of 1 year or more at room temperature. Other temperatures at which thermal stability is customarily measured include 65° C., 55° C and 37° C.

As has been mentioned, the present inhibitor systems are effective in stabilizing a wide variety of monomeric, curable compositions. Thus, a useful stabilizing effect will be observed with curable compositions based upon aromatic monomers such as styrene, vinyl monomers such as butadiene, vinyl chloride and vinylidene chloride, acrylate/methacrylate-type monomers such as methylmethacrylate, ethyleneglycol diacrylate, bisphenol-A dimethacrylate, hydroxypropyl methacrylate, and the like, such as those taught in U.S. Pat. No. 2,895,950. Included among the latter types are the urethane-acrylates/methacrylates, such as those taught by Gorman et al. in U.S. Pat. No. 3,425,988, those disclosed in copending application Ser. No. 356,679, filed May 2, 1973, now abandoned, as well as those taught in copending applications Ser. Nos. 546,250, filed Feb. 3, 1975, now abandoned, 557,740, filed Mar. 12, 1975, now abandoned, and 557,564, filed Mar. 12, 1975, now U.S. Pat. No. 4,018,851. The disclosures of all these patents and applications are incorporated herein by reference.

Monomers of the preceding types are curable by free radical polymerization using any of numerous well-known initiators as a source of free radicals. Among such initiators there may be mentioned peroxides such as hydrogen peroxide and organic peroxides such as benzoyl peroxide and methylethyl ketone peroxide; azo-compounds such as 2,2'-azobis(isobutyronitrile); hydroperoxides such as cumene hydroperoxide, t-butyl hydroperoxide and methylethyl ketone hydroperoxide; peresters which hydrolyze to peroxy compounds, such as t-butyl perbenzoate and t-butyl peracetate; and photo-sensitive compounds such as benzophenone and the benzoin ethers.

As will be appreciated, the concentration of such initiators in any given curable system will be a matter of choice and well within the skill of the art to determine. As a general rule, the initiator concentration will be in the range of about 0.1 percent to about 10 percent by weight of the total curable composition. As to the photo-sensitive (i.e., ultraviolet-sensitive) types of initiator systems, it is a particular advantage of the present inhibitor systems that they may optionally be utilized in substantially increased concentration without significantly interfering with the UV-initiated cure properties. Thus, the inhibitor system concentration may be increased by 4–5-fold, or more, over the lowest commercially useful level, thereby obtaining an outstandingly stable composition but yet without destroying its cure speed. In selecting photo-initiators, a degree of care should be exercised to avoid creating an interactive initiator-inhibitor combination which could impair the effectiveness of either. Thus, for example, the combination of benzoin ethers with the monoethyl ether of hydroquinone should be avoided since these have been found to interact.

The curable stabilized compositions of this invention may be modified by inclusion of any of numerous known additives such as polymerization accelerators (e.g., amides, imides and amines), diluents, viscosity regulators, plasticizers, dyes, etc., provided only that such additives do not significantly interfere with the effectiveness of the present inhibitor systems.

EXAMPLES

The following examples are intended to be illustrative, but not limiting, of the present invention.

EXAMPLE 1

This example shows how the thermal stability of a styrene-based composition of the prior art (1) compares with that of two similar compositions (2), (3) according to the invention.

|   |   | Parts by Weight | Thermal stability (hours) | |
|---|---|---|---|---|
|   |   |   | 55° C. | 65° C. |
| (1) | Styrene | 95.0 | 19 | 6 |
|   | Benzoyl peroxide | 5.0 | | |
| (2) | Styrene | 93.8 | | |
|   | Benzoyl peroxide | 5.0 | | |
|   | Triallyl phosphate | 1.0 | | |
|   | Hydroquinone monomethyl ether | 0.2 | 76 | 19 |
| (3) | Styrene | 92.6 | | |
|   | Benzoyl peroxide | 5.0 | | |
|   | Triallyl phosphate | 2.0 | | |
|   | Hydroquinone monomethyl ether | 0.4 | 140 | 27 |

Composition (1) would normally also contain a conventional hydroquinone-type polymerization inhibitor which can be omitted from (2) and (3). All three compositions were readily polymerizable by techniques standard in styrene technology.

EXAMPLE 2

This example shows how the thermal stability of a polyethyleneglycol dimethacrylate-based composition of the prior art (4) compares with that of a similar composition (5) according to the invention.

|   | (4) | (5) |
|---|---|---|
| Polyethylene glycol dimethacrylate | 95.2 | 94.0 parts by weight |
| Saccharin | 0.4 | 0.4 parts by weight |
| Cumene Hydroperoxide | 4.0 | 4.0 parts by weight |
| N,N-dimethyl-p-toluidine | 0.4 | 0.4 parts by weight |

-continued

|   | (4) | (5) |
|---|---|---|
| Hydroquinone monomethyl ether (M.E.H.Q.) | Nil | 0.2 parts by weight |
| Triallyl phosphate | Nil | 1.0 parts by weight |
| Thermal stability at 82° C. (minutes) | 30 | 72 |

These compositions are inherently anaerobic in nature, i.e., rapid cure is achieved only in the absence of oxygen. In order to test their anaerobic cure characteristics, a few drops of each composition were applied to the threads of mating black oxide nuts and bolts, the nuts and bolts were assembled (thereby excluding oxygen), and cure was allowed to proceed. Both compositions developed satisfactory cured properties; however, it was found that the cure speed of composition (5), while commercially usable, was slower than that of composition (4) of the prior art. (Appropriate tests for anaerobic cure properties are well described in the literature, e.g., U.S. Pat. Nos. 2,895,950 and 3,043,820.)

EXAMPLE 3

This example shows how the thermal stability of a trimethylol propane trimethacrylate-based composition of the prior art (6) compares with that of a similar composition (7) according to the invention.

|   | (6) | (7) |
|---|---|---|
| Trimethylol propane trimethacrylate | 95.0 | 93.8 parts by weight |
| Benzoyl peroxide | 5.0 | 5.0 parts by weight |
| Triallyl phosphate | Nil | 1.0 parts by weight |
| M.E.H.Q. | Nil | 0.2 parts by weight |
| Thermal stability at | | |
| 55° C. | <8 hours | >24 hours |
| 65° C. | <1 hour | > 4 hours |
| 82° C. | 50 minutes | >100 minutes |

It was found that compositions (2), (3), (5) and (7) could be packed safely in high density polythene containers almost completely full, whereas the prior art compositions (1), (4) and (6) had to be packed in partly filled low density polythene containers if premature polymerization due to oxygen exclusion were to be avoided.

EXAMPLE 4

This example relates to a typical ultraviolet light initiatable curing composition of the prior art (8) and a similar composition according to the invention (9). In both, a representative monomer A (in the conventional sense which includes oligomers) is used having the formula

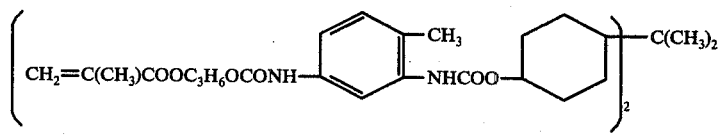

This monomer A may be obtained by reacting 1 mole (120g) of hydrogenated Bisphenol-A (i.e., 4,4'-Dicyclohexanolyl dimethyl methane) with two moles (174g) of toluene 2,4-diisocyanate, and reacting the product with 2 moles (144g) of 3-hydroxypropyl methacrylate.

|  | (8) | (9) |
| --- | --- | --- |
| Monomer A | 93.0 | 91.0 parts by weight |
| Benzophenone | 5.0 | 5.0 parts by weight |
| Acrylic Acid | 2.0 | 2.0 parts by weight |
| Triallyl phosphate | Nil | 1.0 parts by weight |
| M.E.H.Q. | Nil | 1.0 parts by weight |

Composition (8) polymerizes either on deprivation of oxygen or on irradiation by ultra-violet light of suitable intensity, whereas composition (9) polymerizes only on irradiation, the anaerobic polymerization tendency having been substantially suppressed.

Thus the new composition (9) can be applied to tapes which are afterwards coiled into rolls for use. This would not be possible for composition (8) unless expensive extra precautions were taken.

This invention is not limited by or to the details of the specific examples given, many of which can undergo wide variation without departing from the scope of the invention.

What is claimed is:

1. A stabilized, curable composition comprising:
   a. a free radical-polymerizable monomer selected from the group consisting of aromatic and alkyl vinyl compounds, halogen-substituted vinyl compounds, alkyl and aromatic acrylates and methacrylates, and urethane-acrylates and -methacrylates;
   b. an effective amount for initiation of a peroxy or photo-sensitive initiator; and
   c. an effective amount for stabilization of the composition of an inhibitor system selected from the group consisting of an allyl alkoxyl hydroquinone and the combination of a compound containing the allyl group $CH_2=CH-CH_2-$, but no inorganic group of the reducing type, with an alkoxyl hydroquinone, said alkoxyl hydroquinone group containing 1 to about 4 carbon atoms and said inhibitor system being dissolved in the monomer.

2. A composition of claim 1 wherein the monomer is a vinyl compound.

3. A composition of claim 1 wherein the monomer is an acrylate ester.

4. A composition of claim 3 wherein the monomer is a methacrylate ester.

5. A composition of claim 1 wherein the monomer is a urethane-acrylate adduct.

6. A composition of claim 5 wherein the monomer is an adduct of bisphenol-A or hydrogenated bisphenol-A and an aromatic polyisocyanate capped with a hydroxyalkyl methacrylate.

7. A composition of claim 3 wherein the monomer has the formula

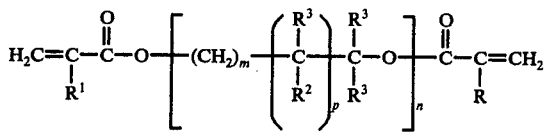

wherein $R^6$ represents a radical selected from the group consisting of hydrogen, lower alkyl of 1-4 carbon atoms, hydroxyalkyl of 1-4 carbon atoms, and

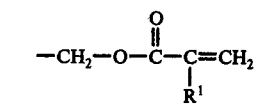

$R^4$ is a radical selected from the group consisting of hydrogen, halogen, and lower alkyl of 1-4 carbon atoms; $R^5$ is a radical selected from the group consisting of hydrogen, —OH and

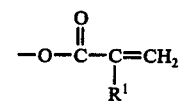

$m$ is an integer equal to at least 1; and $n$ is an integer equal to at least 1; and $p$ is 0 or 1.

8. A composition of claim 5 wherein the monomer is a polymerizable monomer prepared by reacting at a temperature between about 10° C. and about 175° C.: (i) an organic polyisocyanate; and (ii) an acrylate ester containing a hydroxy or amino group in the non-acrylate portion thereof, the ester being used in sufficient amount to react with substantially all of the isocyanate groups of the polyisocyanate.

9. A composition of claim 1 wherein the initiator is an organic peroxide.

10. A composition of claim 1 wherein the initiator is an organic hydroperoxide.

11. A composition of claim 1 wherein the initiator is a perester.

12. A composition of claim 1 wherein the inhibitor system is a mixture of a compound containing the allyl group $CH_2=CH-CH_2-$, but no inorganic group of the reducing type, and a hydroquinone compound of the formula

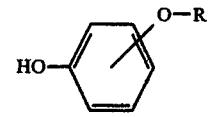

where R is an alkyl group having 1 to about 4 carbon atoms.

13. A composition of claim 12 wherein R is methyl.

14. A composition of claim 1 wherein the inhibitor system is a compound having the formula

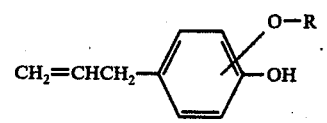

wherein R is an alkyl group having 1 to about 4 carbon atoms.

15. A composition of claim 14 wherein R is methyl.

16. A composition of claim 13 wherein the inhibitor system is a mixture of hydroquinone monoethyl ether and triallyl phosphate.

17. A composition of claim 15 wherein the inhibitor system is 4-allyl-2-methoxy-phenol.

* * * * *